Nov. 8, 1960 B. J. GRACE 2,959,644

ELECTRONIC DEVICE

Filed June 13, 1957

INVENTOR.
Billy J Grace
BY
Mueller & Aichele
Attys.

2,959,644
Patented Nov. 8, 1960

2,959,644

ELECTRONIC DEVICE

Billy J. Grace, Chicago, Ill., assignor to Motorola, Inc., Chicago, Ill., a corporation of Illinois Filed June 13, 1957, Ser. No. 665,513

6 Claims. (Cl. 179—100.11)

This invention relates generally to automobile radio receivers, and more particularly to accessory apparatus for adapting automobile radio receivers for reproduction of signals from tape recordings or signals of other types.

It is known in the art that radio receivers may be used to reproduce a variety of signals such as those produced by tape players, record players, or frequency modulation tuners. Usually, when a set is used to receive such signals, special elements are incorporated into the receiver itself in order to make it adaptable for reproducing the audio component of such signals. Special adapting elements included in a receiver increase its cost and such increase in cost applies to all receivers whether or not attachments are to be used therewith. When there is a widespread demand for the special provisions this increased cost can be justified. However, there are many applications in which it may be desired to use attachments for reproducing signals through a radio receiver where the receiver does not include special provisions. Therefore, it is desirable to provide an accessory device to permit reproduction of signals other than the usual radio reception through a basic receiver of minimum cost which may be installed in a car, and which may be used without modification of the receiver.

Accordingly, it is an object of the invention to provide an attachment for an automobile radio receiver to permit reproduction of various signals thereby, and which may be connected to the receiver without modification thereof.

Another object of the invention is to provide apparatus for coupling a tape recorder to a standard automobile radio receiver without modification of the receiver.

One feature of the invention is the provision of a signal-producing device including amplitude-modulating apparatus for modulating signals to be reproduced so that they may be applied to the radio frequency amplifier stage of an automobile radio receiver for reproduction by the receiver.

Another feature of the invention is the provision of an accessory for an automobile radio receiver which is adapted to be plugged into the antenna receptacle of the receiver for applying modulated signals thereto to be reproduced through the receiver. Switch and jack means may be provided for selectively coupling the accessory and the receiver antenna to the receiver input.

A further feature of the invention is the provision of a player of recorded material and a modulated oscillator wherein the output audio frequency wave of the player is applied at low level to the oscillator for modulating the radio frequency wave produced by the oscillator to provide a modulated wave which may be amplified and reproduced by an automobile radio receiver.

A still further feature of the invention is the provision of a frequency modulation tuner coupled to an amplitude modulated oscillator, wherein the frequency modulated output of the tuner is converted to an amplitude modulated signal, and the amplitude modulated output of the oscillator is applied to a radio frequency stage of an automobile radio receiver.

Referring now to the drawings.

Figures 1, 2, 3, 4:
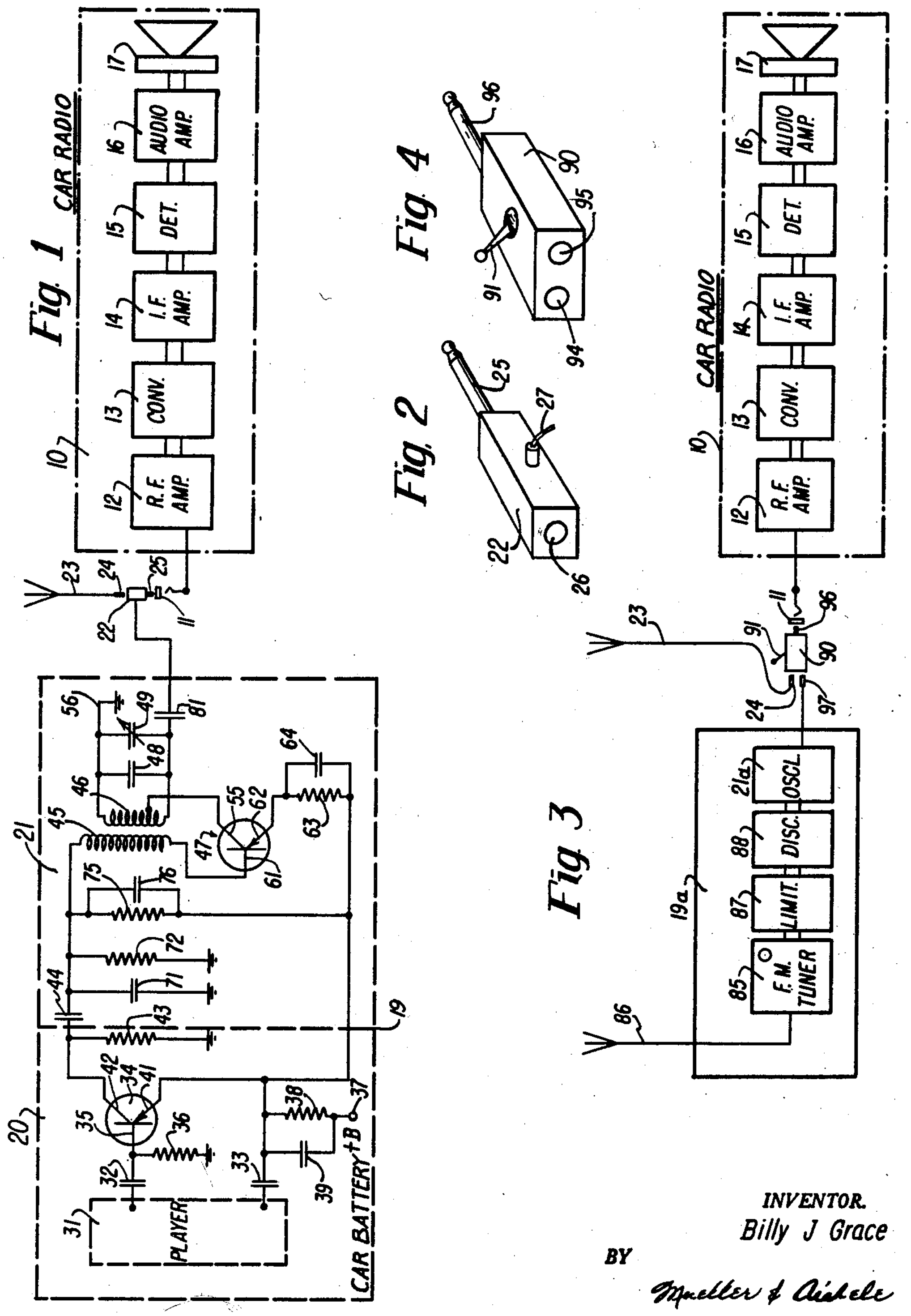
Fig. 1 shows a system in accordance with the invention including a signal-producing device coupled to an automobile radio receiver.
Fig. 2 is a perspective view of the adapter plug shown in Fig. 1.
Fig. 3 shows a system forming an alternate embodiment of the invention.
Fig. 4 is a perspective view of the adapter plug shown in Fig. 3.

The invention includes a signal-producing device for providing amplitude modulated signals which may be applied to the radio frequency stage of an amplitude modulation automobile radio receiver. The signals may be applied to the radio receiver through an adapter plug which plugs into the antenna receptacle of the receiver so that modification of the receiver is not required. The signal-producing device may include various signal sources such as a player of recorded material or a frequency modulation tuner. The player of recorded material used in the device may be a type which plays tapes or a type which plays records. The signal-producing device includes an oscillator to produce a radio frequency wave which is amplitude modulated by the signal generated by the player or tuner element. Since automobile radio receivers usually include a radio frequency amplifier and are quite sensitive, the output of the oscillator may be a relatively low-level signal which is amplified in the receiver to produce a signal at a level to be reproduced. A simple transistor amplifier and transistor oscillator have been found to provide signals at an adequate level.

The invention further includes an adapter plug for coupling the signal-producing device to the receiver. The adapter plug may be inserted into the antenna receptacle of an automobile radio receiver. Provision may be made for connecting both the receiver antenna and the signal-producing device to the adapter so that the signal to be reproduced can be selected by the listener.

In Fig. 1 there is shown the system in accordance with the invention using an automobile radio receiver 10 of the amplitude modulation type. Receiver 10 is of a standard design which includes an antenna receptacle 11 for applying signals to radio frequency amplifier stage 12. The receiver is of the superheterodyne type having a converter 13 for reducing received signals to intermediate frequency and an intermediate frequency amplifier 14. The signals are detected by detector 15, amplified in audio amplifier 16 and reproduced by loudspeaker 17.

Signals are applied to the receiver 10 by adapter 22 including a plug 25 for insertion into antenna socket 11. Antenna 23 and signal-producing device 19 may be connected in parallel to plug 25. Signal-producing device 19 provides amplitude modulated radio frequency signals within the range of the radio receiver and preferably at one end of the range so that signals from the device will not interfere with received radio signals. The signal producing device 19 includes a player-amplifier stage 20 and an oscillator stage 21.

The stage 20 includes player element 31 which may be a type which plays records or a type which plays tapes. The output of player 31 is applied to an amplifier element including transistor device 34. The terminals of player element 31 are connected across the emitter 41 and the base 35 of device 34, and the collector 42 is coupled to the oscillator stage 21. Capacitors 32 and 33 are provided in the lines from the terminals of player 31 to prevent D.C. current from entering the player. Direct current is applied to transistor device 34 from battery 37 which is connected through resistor 38 to the emitter 41. The resistor is by-passed by capacitor 39.

Biasing resistor 36 is connected between ground and the base 35. The output of player 31 is amplified by the transistor amplifier and is applied across resistor 43 connected to the collector 42.

Oscillator stage 21 includes transistor device 47 of P–N–P type and having a base 61, a collector 55 and an emitter 62. The emitter 62 is connected to player 31 and battery 37. Biasing resistor 63 is connected to emitter 62, and shunt capacitor 64 by-passes resistor 63 to provide a by-pass for R–F frequencies. Capacitor 44 is connected to the base 61 and capacitor 71 is connected between ground and base 61. These capacitors form a capacity divider for matching the impedences of stages 20 and 21. Biasing resistor 72 is connected between ground and base 61. Direct current from battery 37 flows to ground through resistor 72 developing negative bias for base 61. A filter is formed by resistor 75 and capacitor 76 connected in parallel across base 61 and emitter 62 to prevent frequency modulation of oscillator stage 21. The signal from stage 20 is applied across base 61 and emitter 62 through resistor 75. The capacitor 76 by-passes resistor 75 for R–F currents. Inductance coil 45 is coupled to base 61 and this coil is magnetically coupled with inductance coil 46 provided in the tank circuit of transistor device 47. A current flowing from emitter 62 to collector 55 and through coil 46 will, by means of the mutual inductance of coils 45 and 46, induce a voltage in coil 45. The connections are such that the induced voltage aids the emitter to collector current so that the coupling is regenerative and provides feed-back from the tank circuit. A line connected to collector 55 is tapped into inductance coil 46 intermediate the ends thereof. Fixed capacitor 48 and variable capacitor 49 are connected in parallel with inductance coil 46 for tuning the tank circuit to a resonant frequency. One end of inductance coil 46 is connected to ground thus grounding collector 55. The other end of coil 46 is connected through capacitor 81 to adaptor 22.

The oscillator stage 21 may be tuned to oscillate at a frequency at one end of the broadcast band. A frequency within the broadcast band which is not utilized in a particular area may be used, or a frequency outside the broadcast band but within the tuning band of radio receivers. The audio frequency voltage produced by player 31 and amplified by transistor device 34 is applied across resistor 75 so that the voltage variations of the signal produced amplitude variations in the emitter to collector current, thus modulating the radio frequency voltage generated by oscillator stage 47. The resultant amplitude modulated signal can be applied through adapter 22 to radio receiver 10.

The following circuit constants may be used in the circuit of Fig. 1, but are given merely by way of example and are not intended to limit the scope of the invention in any way.

| | | |
|---|---|---|
| Resistor 36 | meghoms | 1.2 |
| Resistor 38 | kilohms | 10 |
| Resistor 63 | ohms | 2200 |
| Resistor 43 | kilohms | 10 |
| Resistor 72 | megohms | 2.2 |
| Resistor 75 | kilohms | 225 |
| Capacitor 32 | microfarads | 8 |
| Capacitor 33 | do | 8 |
| Capacitor 44 | do | .1 |
| Capacitor 39 | do | 10 |
| Capacitor 71 | do | .01 |
| Capacitor 76 | micromicrofarads | 330 |
| Capacitor 64 | do | 1000 |
| Capacitor 81 | microfarads | 5.6 |
| Capacitor 48 | micromicrofarads | 100 |
| Capacitor 49 | Between 8 and 50 micromicrofarads | |
| Coil 45 | | 15 turns |
| Coil 46 | | Total of 75 turns, and |

Collector 55 is tapped into the coil 46 at a point 10 turns up from the bottom of the coil 46.

Adapter element 22 is shown in detail in Fig. 2. A pair of conductors 27 are adapted to be connected to the output leads of signal-producing device 19. The adapter includes a jack 26 adapted to receive a plug 24 of antenna 23. Jack 26 and conductors 27 are connected in parallel to plug 25. The plug is adapted to be inserted into the antenna socket 11 which is a standard element of radio receiver 10.

Radio frequency amplifier 12 of receiver 10 has high sensitivity, and therefore it is well adapted to receive and amplify the low-level signals produced by the transistorized signal producing device. When the radio frequency amplifier 12 is tuned to a frequency corresponding to that produced by signal-producing device 19, the output of device 19 will be amplified by element 12 and beat down to a predetermined frequency by element 13. This intermediate frequency signal is amplified by element 14 and converted to audio frequency voltages by element 15. The audio frequency voltage is amplified to audio levels by element 16 and reproduced by element 17. When the radio frequency amplifier 12 is tuned to a frequency within the broadcast band, the receiver will reproduce the audio component of signals picked up by antenna 23. Thus, the listener can select a desired signal by tuning the radio receiver.

An alternate embodiment of the invention is shown in Fig. 3. The signal-producing device 19*a* in this embodiment includes a frequency modulation tuner 85 which receives and amplifies frequency modulated signals picked up by an antenna 86. These signals are applied to a limiter 87 which removes any amplitude variations in the signals. The frequency modulated signals are then passed to a discriminator which converts the frequency variations into amplitude variations. Next the signal is applied to an oscillator 21*a* of the type shown in Fig. 1 where the signal is used to modulate a radio frequency voltage having a frequency within the radio frequency range of the receiver and preferably at one edge of the broadcast band.

Signal-producing device 19*a* is connected to an adapter 90 which is a modified form of adapter 22. Adapter 90 is shown in detail in Fig. 4. A jack 95 is provided for receiving a plug 97 which is connected to the output line of signal-producing device 19*a*. Another jack 94 is provided to receive plug 24 of antenna 23. Antenna 23 and device 19*a* are connected in parallel through adapter 90 to plug 96 which is inserted in antenna socket 11 of receiver 10. Switch 91 is provided for alternately coupling device 19*a* or antenna 23 to receiver 10. Thus, by using adapter 90 it is not necessary that the carrier wave generated by oscillator 21*a* have a frequency outside the broadcast band. Adapter 90 could be used with signal-producing device 19 to provide alternate switching means.

When switch 91 is operated to couple device 19*a* to receiver 10, the amplitude modulated output signal of the device is applied to radio frequency amplifier 12. Since amplifier 12 possesses high sensitivity it is not necessary to pre-amplify the signal before applying it to receiver 10. The signal applied to the receiver is beat down to a predetermined frequency by oscillator mixer 13, this frequency being one to which amplifier 14 is tuned. Detector 15 interprets the amplitude modulated signal in terms of an audio frequency voltage which is then applied to audio amplifier 16 and reproduced by a loudspeaker 17.

It is apparent that the foregoing described embodiments of the invention permit a player of recorded material or a frequency modulation tuner to be used with a standard automobile radio receiver. Regardless of which embodiment of the invention is used, a radio frequency signal is applied to the receiver which does not require that any special elements be used in the receiver. For instance, it is not necessary that the intermediate frequency amplifier of the receiver be tuned to a wide range of frequencies when frequency modulated signals are being received because such signals are converted to amplitude modulated signals of the frequency to which the intermediate frequency amplifier of the receiver is tuned. Furthermore, the low-level output of the signal-producing device is applied to the sensitive radio amplifier stage of the receiver thus minimizing the amplification required in the signal-producing device itself.

The signals are coupled directly to the receiver input rather than being radiated through the air to the receiver antenna and by this system effective coupling is provided and external noises which might be picked up by the antenna are reduced. The adapter plug included in the invention permits the signal-producing device to be connected directly to the antenna terminal of the receiver. Thus, the invention has the advantage of not requiring use of special jacks in the receiver or cable connections from the device to the audio amplifier.

I claim:

1. A portable player of recorded material for use with an automobile radio receiver having an antenna plug and receptacle and adapted to be powered by the automobile battery, said player including in combination, a player stage for producing an audio frequency signal, an amplifier stage coupled to said player stage for amplifying said audio frequency signal, said amplifier stage including a transistor having base, emitter and collector electrodes, means applying the audio frequency signal across said base and emitter electrodes, bias circuit means for connecting said emitter electrode to the automobile battery, circuit means connected to said collector electrode for developing an output voltage, a modulated oscillator stage including a transistor having base, emitter and collector electrodes, an input circuit in said oscillator stage coupled between said collector electrode of said amplifier transistor and said base electrode of said oscillator transistor having filter means and inductor means to provide direct amplitude modulation of said oscillator by the amplified audio frequency signals, said bias circuit means being connected to said emitter electrode of said oscillator transistor, an output circuit in said oscillator stage connected to said collector electrode of said oscillator transistor and having a tunable circuit portion for generating radio frequency oscillation, said tunable circuit portion having inductor means coupled to said inductor means of said input circuit to provide regenerative feedback in said oscillator transistor, and conductor means coupled to said oscillator stage output circuit having an adapter plug to selectively connect said output circuit and the radio antenna to the radio antenna receptacle, whereby said amplitude modulated radio frequency signals are conducted directly to said radio antenna input for amplification and reproduction by said receiver.

2. In a portable device adapted for use with an automobile radio receiver having an antenna plug and receptacle, an automobile battery powered accessory coupling stage connected to said portable device including in combination, oscillator means having a transistor device for producing a radio frequency carrier wave at relatively low level, said oscillator means including modulating means responsive to audio frequency signals from the portable device for amplitude modulating the same, an adapter element including a plug adapted both to receive the radio antenna plug and to be inserted into the antenna receptacle of the radio receiver, and conductor means for connecting said oscillator means to said plug for conducting the low level modulated carrier wave directly to the radio receiver antenna receptacle for amplification and reproduction of said signal by said receiver.

3. An accessory device adapted for use in an automobile with a radio receiver therein having an antenna plug and receptacle therefor, said device being powered by the automobile battery and including in combination, means for producing audio frequency signals, a transistor having input, output and common electrodes, an input circuit having filter means and inductor means connected across the input and common electrodes of said transistor, a power supply circuit connected between the automobile battery and the common electrode of said transistor, an output circuit connected across the output and common electrodes of said transistor and having a tunable tank circuit for generating radio frequency oscillations, said tank circuit having inductor means coupled to said inductor means of said input circuit to provide regenerative feedback in said oscillator, means for applying the audio frequency signals to said input circuit for directly amplitude modulating said radio frequency oscillations, and an output adapter circuit coupled to said output circuit and having an adapter plug including a portion for receiving the antenna plug to provide connection of the radio antenna and said output circuit to the antenna receptacle of the radio receiver, whereby said amplitude modulated radio frequency signals are conducted directly to the radio receiver for amplification and reproduction thereby.

4. In a vehicle equipped with an amplitude modulation radio receiver having an antenna plug receptacle and also an antenna having a lead-in conductor terminating in a plug adapted to fit in said receptacle and wherein a signal translating accessory device adapted for use in said vehicle is coupled to the antenna input of the radio receiver to obtain sound reproduction of audio frequency signals from said accessory device, the combination with said accessory device of an accessory coupling stage including oscillator means having an active electron device for producing a radio frequency carrier wave at relatively low level and at a frequency within the range of frequencies received by said radio receiver, said oscillator means being adapted to be energized directly from the battery of the automobile and including modulating means responsive to audio frequency signals from said accessory device for amplitude modulating the produced radio frequency carrier wave, adaptor means including a socket adapted to receive the radio antenna plug and a plug insertable into the antenna receptacle of the radio receiver, and output conductor means for connecting said oscillator means to said plug for conducting the low level amplitude modulated carrier wave directly to the radio receiver antenna receptacle for amplification and reproduction of such signals by said receiver.

5. The combination as defined by claim 4 wherein said accessory device is a frequency modulation tuner.

6. The combination as defined by claim 4 wherein said adaptor means includes first connector means having a socket to receive the radio antenna plug, second connector means including a plug adapted to fit into the antenna receptacle of said radio receiver, conducting means connected to said plug for connecting said output conductor means to said radio receiver for reproduction of audio frequency signals from said accessory device, and switch means for directly connecting said first connector means to said second connector means for reception of amplitude modulation broadcast waves.

References Cited in the file of this patent

UNITED STATES PATENTS

| | | |
|---|---|---|
| 1,632,788 | Diener | June 21, 1927 |
| 2,129,227 | Morse | Sept. 6, 1938 |
| 2,395,390 | Antalek | Feb. 26, 1946 |
| 2,655,565 | Thompson | Oct. 13, 1953 |
| 2,886,653 | Lin | May 12, 1959 |